(12) United States Patent
Barber (10) Patent No.: US 9,296,460 B2
(45) Date of Patent: *Mar. 29, 2016

(54) AIRSHIP WITH INTERNAL PROPULSION SYSTEM

(71) Applicant: Phillip R. Barber, Kalamazoo, MI (US)

(72) Inventor: Phillip R. Barber, Kalamazoo, MI (US)

( * ) Notice: Subject to any disclaimer, the term of this patent is extended or adjusted under 35 U.S.C. 154(b) by 375 days.

This patent is subject to a terminal disclaimer.

(21) Appl. No.: 13/767,844

(22) Filed: Feb. 14, 2013

(65) Prior Publication Data

US 2013/0256459 A1 Oct. 3, 2013

Related U.S. Application Data

(60) Provisional application No. 61/598,879, filed on Feb. 14, 2012.

(51) Int. Cl.
| | | |
|---|---|---|
| *B64B 1/26* | (2006.01) | |
| *B64B 1/20* | (2006.01) | |
| *B64B 1/10* | (2006.01) | |
| *B64B 1/12* | (2006.01) | |
| *B64B 1/58* | (2006.01) | |
| *B64G 1/26* | (2006.01) | |
| *B64G 1/40* | (2006.01) | |

(52) U.S. Cl.
CPC ... *B64B 1/26* (2013.01); *B64B 1/10* (2013.01); *B64B 1/12* (2013.01); *B64B 1/20* (2013.01); *B64B 1/58* (2013.01); *B64G 1/26* (2013.01); *B64G 1/40* (2013.01); *B64B 2201/00* (2013.01)

(58) Field of Classification Search
CPC ............. B64B 1/00; B64B 1/02; B64B 1/06; B64B 1/10; B64B 1/12; B64B 1/20; B64B 1/24; B64B 1/26
See application file for complete search history.

(56) References Cited

U.S. PATENT DOCUMENTS

| | | | | | |
|---|---|---|---|---|---|
| 1,343,428 | A | * | 6/1920 | Berry | 244/30 |
| 1,457,024 | A | * | 5/1923 | Franzen | B64B 1/40 |
| | | | | | 244/29 |
| 1,822,849 | A | * | 9/1931 | Ellinger | 244/30 |
| 1,835,260 | A | * | 12/1931 | Barrera | 244/30 |
| 1,895,518 | A | * | 1/1933 | Peck | 244/52 |
| 1,977,392 | A | * | 10/1934 | MacKenzie | 244/51 |
| 1,998,380 | A | * | 4/1935 | Medoff | 244/125 |
| 2,384,893 | A | * | 9/1945 | Crook | 244/73 R |
| 2,475,786 | A | * | 7/1949 | Jordan | 244/30 |
| 3,185,411 | A | * | 5/1965 | Gembe | 244/30 |
| 3,288,397 | A | * | 11/1966 | Fitzpatrick | 244/29 |
| 3,346,216 | A | * | 10/1967 | Desmarteau | 244/30 |
| 3,620,485 | A | * | 11/1971 | Gelhard et al. | 244/29 |
| 4,685,640 | A | * | 8/1987 | Warrington et al. | 244/29 |
| 4,967,983 | A | * | 11/1990 | Motts | 244/30 |
| 5,071,090 | A | * | 12/1991 | Takahashi et al. | 244/29 |
| 5,645,248 | A | * | 7/1997 | Campbell | 244/30 |
| 6,082,670 | A | * | 7/2000 | Chapman | 244/55 |
| 6,354,535 | B1 | * | 3/2002 | Perry et al. | 244/24 |
| 6,427,943 | B2 | * | 8/2002 | Yokomaku et al. | 244/30 |
| 6,607,163 | B2 | * | 8/2003 | Perry et al. | 244/24 |
| 6,766,982 | B2 | * | 7/2004 | Drucker | 244/96 |
| 2004/0075021 | A1 | * | 4/2004 | Drucker | 244/96 |
| 2009/0200416 | A1 | * | 8/2009 | Lee | 244/30 |

* cited by examiner

*Primary Examiner* — Joseph W Sanderson
(74) *Attorney, Agent, or Firm* — Dale J. Ream (57) ABSTRACT

An airship is presented having a plurality of resilient gas bags and gas containers, a straight fuselage tubular hull, with an inner air passageway and propulsion system located therein, and, connecting air inlet, and outlet funnels fore, and aft, with air deflector cones axially positioned therein. The ship also contains propulsion, reverse, and directional rocket thrusters, in addition to typical airship components.

11 Claims, 7 Drawing Sheets

AIRSHIP WITH INTERNAL PROPULSION SYSTEM

CROSS REFERENCE TO RELATED APPLICATIONS

This application claims the benefit of U.S. provisional patent application having Ser. No. 61/598,879, and having a filing date of Feb. 14, 2012.

BACKGROUND OF THE INVENTION

The present invention relates to airships and more particularly to airships having internal or ducted propulsion systems.

Airships are well known, and have grown in popularity in recent years.

It is also well known that airships or dirigible type of aircraft are useful where quiet, the ability to hover in one place for an extended period, and to land in un-developed areas are desired. Yet conventional designs are lacking for speed, efficiency, and maneuverability. And, that previous airship designs are slow, sluggush, inefficient and, incapable in high-wind gusts, and adverse weather.

Over the years there have been numerous improvements made to airships, and many designs to solve the problems described above.

These designs have generally been concentrated on the area of buoyancy control, propulsion, and aerodynamics, yet the best designs do not adequately solve the problems of slow, sluggush, inefficient, and high-wind-gust, and adverse-weather incapability to a satisfactory degree.

U.S. Pat. No. 6,607,163 discloses a conventional conical shaped airship with near space buoyancy and propulsion means however it does not have a tubular straight fuselage, non-protruding attitudinal control wings, air deflector cones, an inner air passageway, internal propulsion means, or outer atmospheric propulsion & attitudinal control means.

U.S. Pat. No. 5,071,090 shows a conventional conical shaped airship with an internal air passageway, and internal propulsion means, however it does not have a tubular straight fuselage, non-protruding attitudinal control wings, air-inlet & air outlet funnels, or air deflector cones, or outer atmospheric propulsion & attitudinal control means.

U.S. Pat. No. 4,967,983 describes an airfoil type airship with an internal air passageway, however it does not have a tubular straight fuselage, non-protruding attitudinal control wings, air deflector cones, or outer atmospheric propulsion & attitudinal control means.

U.S. Pat. No. 1,835,260 shows a conventional conical shaped airship with an internal air passageway, and internal propulsion means, however it does not have a fuselage, non-protruding attitudinal control wings, air deflector cones, or outer atmospheric propulsion & attitudinal control means.

U.S. Pat. No. 2,384,893 shows an airfoil airship having an internal air passageway however it does not have a tubular straight fuselage, non-protruding attitudinal control wings, air deflector cones, or outer atmospheric propulsion & attitudinal control means.

U.S. Pat. No. 3,288,397 shows a tri-hull airship airfoil with conventional elliptical shaped airship fuselages affixed together comprising an air-ship airfoil, having external control apertures and external propulsion means however it does not have a tubular straight fuselage, non-protruding attitudinal control wings, air deflector cones, an inner air passageway, an internal propulsion means, or outer atmospheric propulsion & attitudinal control means.

SUMMARY OF THE INVENTION

A main advantage of the present invention is providing an improved airship that attempts to solve the problems of conventional airships detailed herein by incorporating one or more of the characteristics discussed in the embodiments listed below.

Accordingly several advantages of one or more aspects of the present invention are to provide an airship having improved speed performance, maneuverability, efficiency, and adverse weather capability.

It is a further advantage of the invention to provide an airship with reduced air displacement, forward air resistance, and rearward drag of the airship.

It is another advantage of the invention to provide an airship with improved airflow direction into, out of, and around the airship.

It is yet another advantage of the invention to provide an airship with improved attitudinal, directional, pitch, roll, & yaw, control, further, improved airflow control into, out of, and around the airship.

It is still another advantage of the invention to provide an improved airship with propulsive, attitudinal & directional control in space, air atmosphere, and transition to and from thereof.

The foregoing and other advantages are realized by providing a linear straight tubular shaped fuselage, having an inner air passageway axially extending there-through tapering inwardly from the furthest circumferential peripheral exterior edges of the fuselage fore, toward the interior mid region of the airship like a funnel, forming an air inlet in the fuselage fore, which then connects to the inner air passageway; propelling air into and out of the airship is the propulsion system located inside the inner air passageway which extends downstream and continues to the airship aft tapering outwardly like a funnel to the furthest circumferential peripheral exterior edges of the fuselage aft forming an air outlet in the aft of the fuselage.

This causes air to be transported from the front of the airship, into and through the inner air passageway out of and behind the airship, thereby moving the airship through the air.

The straight tubular shaped fuselage also having a plurality of air deflector cones axially centrally positioned substantially inside and extending from the air inlet and outlet openings fore and aft in the fuselage, connectedly affixed to the air inlet funnel and fuselage which direct airflow into and out of the airship to the circumferential peripheral regions of the air inlet and outlet openings, into, out-of, & through the inner air passageway which extends axially through the fuselage, thereby directing the airflow into, through, and out of the airship fuselage.

The plurality of airship deflector cones further providing containment for a plurality of lighter than air resilient gas bags thereby providing dynamic buoyant lift further adding to the airships buoyancy.

Further, a plurality of bifurcated active and non-active winged control surfaces located at the fore and aft of the air inlet and outlet inner air way openings. The winged control surfaces being positioned horizontally and vertically across the inner air way openings, having the active control surfaces being rotate-ably, hinge-ably, attached to the non active control surfaces, and a plurality of actuators attached between the air intake and air outlet sections of the fuselage and to the control surfaces thereby operate-ably, rotate-ably, actuating the hinged active control surfaces respective to their non active control surfaces.

Thereby operate-ably, controlling direction of air flow into the air inlet opening and out of the air outlet opening; controlling direction, pitch, roll and yaw, of the airship.

The result is an improved airship having reduced air displacement, forward air resistance, rearward drag, fuel economy, speed performance, maneuverability, efficiency, and adverse weather capability.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which FIGS. 1, 2, 3, 4, 5, 6, 7, 8, 9, 10, 10A, 11, & 11A illustrate various views of embodiments of the present invention wherein:

In describing the preferred embodiment of the invention, which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word "attached," "operate-ably," "rotate-ably," "connectedly," or terms similar thereto are often used. They are not limited to direct connection but include connection through other elements where such connection is recognized as being equivalent by those skilled in the art.

DESCRIPTION OF THE PREFERRED EMBODIMENT

The present invention and the various features and advantageous details thereof are explained more fully with reference to the non-limiting embodiments described in detail in the following description.

Various alternative embodiments and modifications to the invention will be made apparent to one of ordinary skill in the art by the following detailed description taken together with the drawings.

Accordingly it will also be understood the present invention as disclosed herein shall include materials & equipment including but not limited to pluralities of heat shields, motors, engines, compressors, compressed gas tanks, fuels, fuel tanks, pumps, pipes, valves, hoses, fittings, hydraulics, solenoids, actuators, batteries, computers, electronics, sensors, receivers, guidance & control systems, electronics, motors, servos, wires, connectors, connecting rods, composites, laminates, fabrics, carbon fiber, aluminum, titanium, gaskets, fasteners, adhesives, sealants, lubricants, gases, gaseous liquids, liquids, propulsive fuels, and all other materials, parts, equipment & apparatus for airship, aircraft and spacecraft construction &, operations shall be used.

Figure 1:
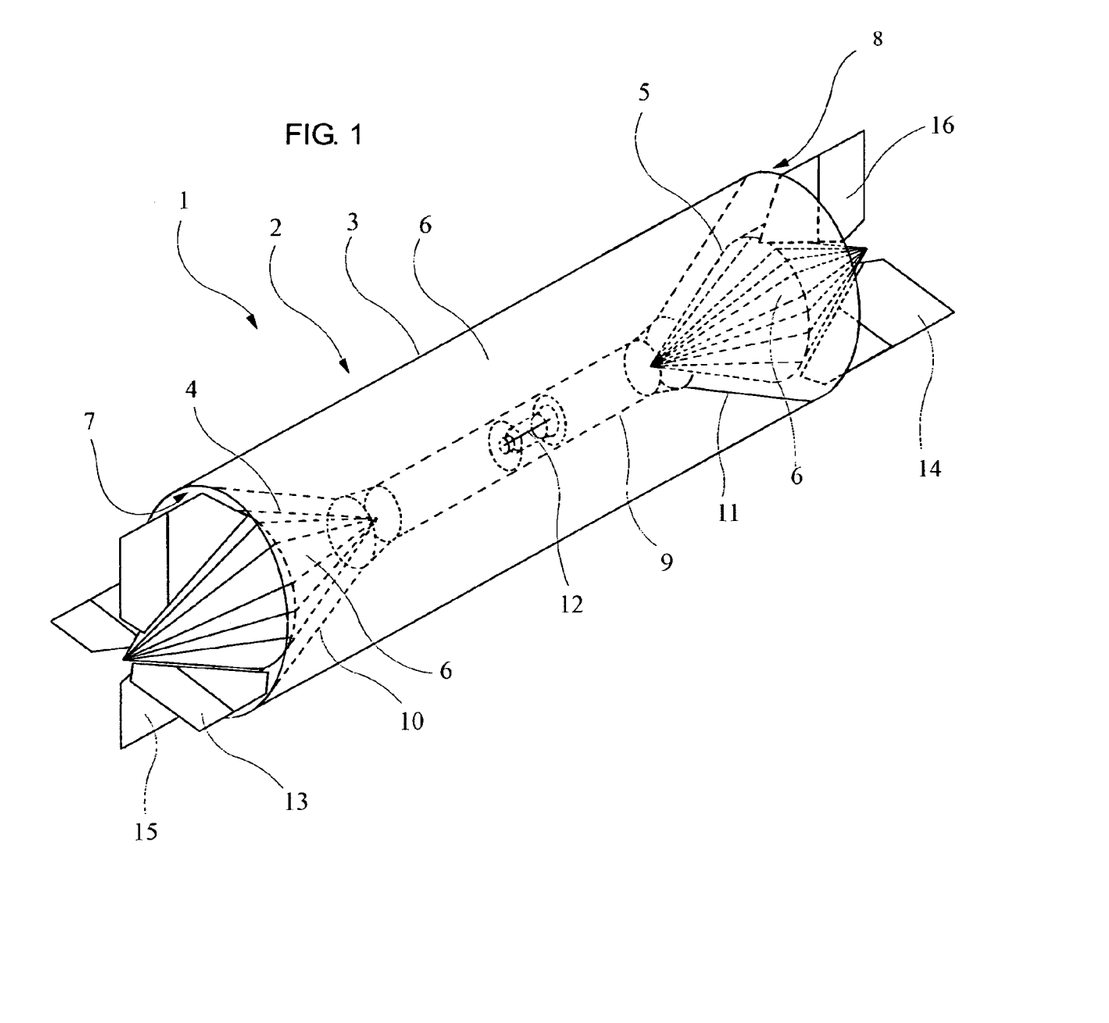
FIG. 1 is a sectional perspective view of the tubular airship.

Referring now to FIG. 1, it will be seen a schematic perspective view preferred embodiment of the invention; a tubular airship made in accordance with the present invention designated generally by reference numeral 1, is shown with its-s its primary components.

The tubular airship 1, has a linear straight tubular shaped fuselage designated generally by reference numeral 2.

Fuselage 2, having 6 sections: a linear straight tubular hull 3, an air deflector cone aft 4, an air deflector cone fore 5, an inner air passageway 9, an inner-air passageway outlet funnel 10, an inner-air passageway inlet funnel 11.

The fuselage 2, tubular hull 3, inner air passageway 9, extends axially there-through the tubular hull 3, tapering inwardly from the furthest circumferential peripheral exterior edges in fore of tubular hull 3, forming inner air passageway inlet funnel 11, in fore of tubular hull 3, connecting to inner air passageway 9, axially extending downstream continuing to airship fuselage air outlet aft tapering outwardly to the furthest circumferential peripheral exterior edges in aft of tubular hull 3, forming inner air passageway outlet funnel 10, in aft of tubular hull 3.

The fuselage 2, further shown having fuselage air deflector cone fore 5, positioned centrally substantially inside and extending from fuselage air inlet 8, connectedly affixed to the airship fuselage tubular hull 3, fuselage inner air passageway inlet funnel 11, so as to allow for an air passageway between the fuselage inner air passageway inlet funnel 11, and the fuselage air deflector cone fore 5.

Air deflector cone fore 5, position further defined as centrally substantially located inside and extending out of fuselage inner air passageway inlet funnel 11, connecting to inner air passageway 9, containing propulsion means 12, centrally axially located within inner air passageway 9, which is connected to inner air passageway outlet funnel 10, forming air outlet 7, having air deflector cone aft 4, positioned centrally substantially inside and extending from fuselage air outlet 7. Air deflector cone aft 4, position further defined as centrally substantially located inside and extending out of fuselage inner air passageway outlet funnel 10, connectedly affixed to the airship fuselage tubular hull 3, and the fuselage inner air passageway outlet funnel 10, so as to allow for an air passageway between the fuselage inner air passageway inlet funnel 11, and the fuselage air deflector cone aft 4.

The fuselage air deflector cones direct air flow to the circumferential perimeters of the airship air inlets and outlets, thereby minimizing forward air resistance and rearward drag.

The linear straight tubular airship 1, further shown having aft bifurcated active & non active horizontal attitudinal control wings rotate-ably, hinge-ably, attached 13, and aft bifurcated active & non active vertical attitudinal control wings rotate-ably, hinge-ably, attached 15, affixed to a plurality of actuators connected between fuselage inner air passageway outlet funnel 10, and the fuselage air deflector cone aft 4, in the fuselage air outlet 7.

It will be further understood the linear straight tubular airship 1, further shown having fore bifurcated active & non active horizontal attitudinal control wings rotate-ably, hinge-ably, attached 14, and, fore bifurcated active & non active vertical attitudinal control wings rotate-ably, hinge-ably, attached 16, affixed to a plurality of actuators connected between fuselage inner air passageway inlet funnel 11, and the fuselage air deflector cone fore 5, in the fuselage air inlet 8. Thereby actuate-ably controlling direction of air flow into fuselage air inlet 8, and out of fuselage air outlet 7, providing directional, pitch, roll & yaw control of the linear straight tubular airship 1.

Figure 2:
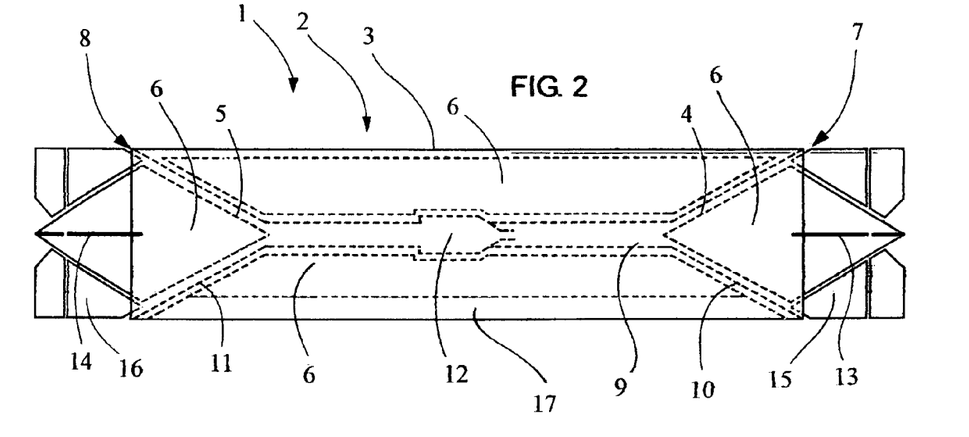
FIG. 2 is a sectional side view of the tubular airship.

Referring now to figure FIG. 2 a side schematic view will be seen further showing the primary components of the tubular airship 1, having the fuselage 2, including the fuselage tubular hull 3, the fuselage air deflector cone fore 5, the fuselage air deflector cone aft 4, the fuselage inner air passageway 9, the fuselage inner air passageway outlet funnel 10, the fuselage inner air passageway inlet funnel 11, the propulsion means 12, the horizontal control wings aft 13, the vertical control wings aft 15, the horizontal control wings fore 14, the vertical control wings fore 16, a plurality of resilient gas bags 6, the fuselage air inlet 8, the fuselage air outlet 7, and the cargo & operating equipment bay 17.

Figure 3:
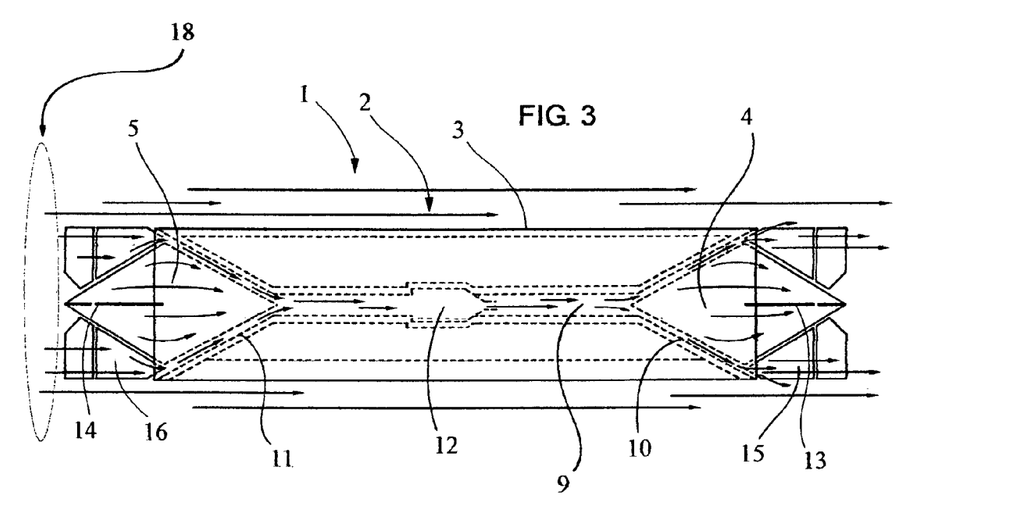
FIG. 3 is a sectional side view of the tubular airship showing the aerodynamic flow through, around, over and under the fuselage.

Referring to FIG. 3 a schematic side view will be seen, providing an understanding of the airflow 18, into the fuselage inner air passageway inlet funnel 11, over the vertical control wings fore 16, the horizontal control wings fore 14, around the fuselage air deflector cone fore 5, through the fuselage inner air passageway 9, through the propulsion means 12, and out through the fuselage inner air passageway outlet funnel 10, around the fuselage air deflector cone aft 4, over the vertical control wings aft 15, and horizontal control wings aft 13, then out of, and behind the airship. Thereby moving the air from in front of the airship, through, and behind the airship.

Figure 4:
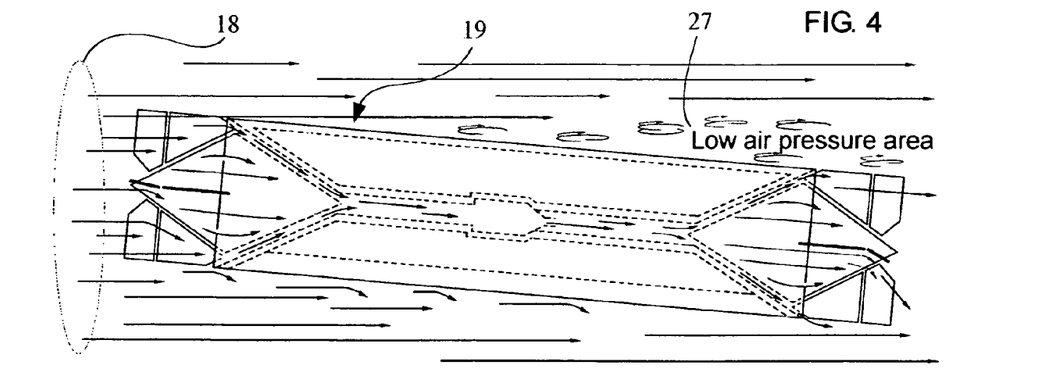
FIG. 4 is a sectional side view of the tubular airship showing the aerodynamic flow through, around, over and under the tri-tube airship fuselage embodiment of the present invention.

Referring to FIG. 4 a schematic side view of the tubular airship 1, tri-tube airship 19, embodiment of the disclosed invention will be seen. Further it will be understood the airflow 18, into, through, out of, and around the tri-tube airship 19. More particularly the low air pressure area 27, lifting action generated by the tri-tube airships airfoil aerodynamics provided by the tri-tube airship 19, as the airship is positioned relative to oncoming airflow over through, out of, behind, and under the tri-tube airship 19.

Figure 5:
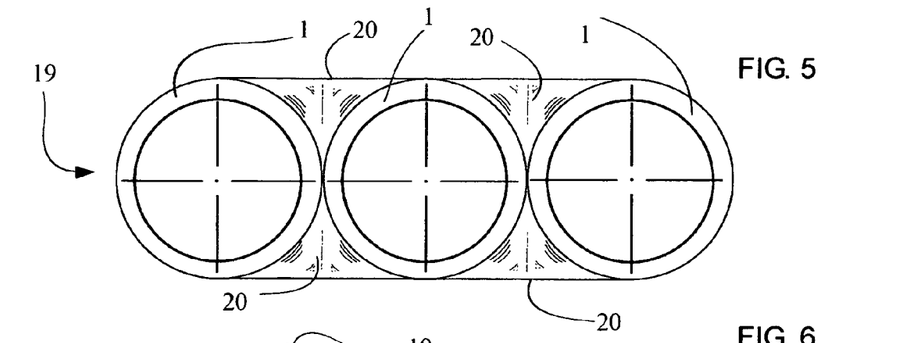
FIG. 5 is a schematic sectional end view showing the tri-tube airship fuselage embodiment of the present invention.
Figure 6:
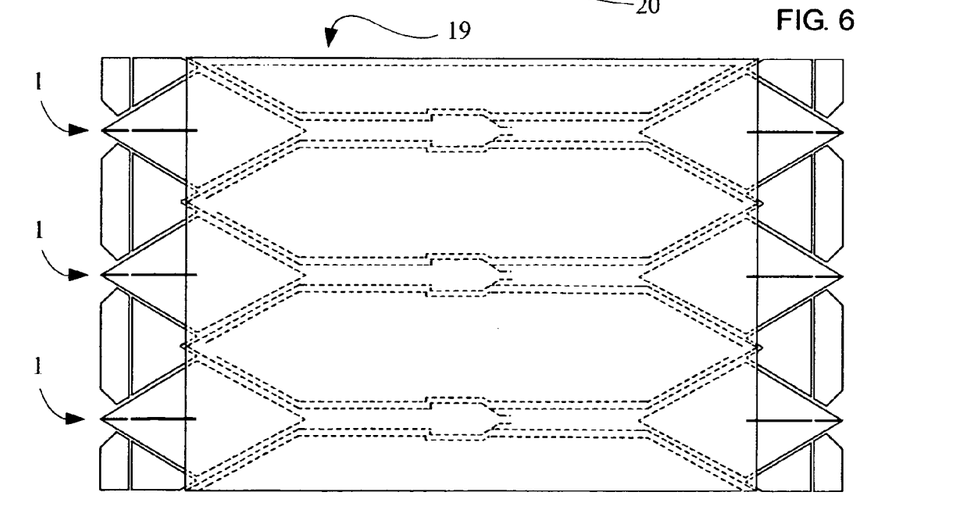
FIG. 6 is a sectional top or bottom view showing the tri-tube airship fuselage embodiment of the present invention.

Referring now to FIG. 5, a schematic sectional end view will be seen showing the tubular airship 1, tri-tube airship 19, embodiment of the disclosed invention. Further it will be understood that the tri-tube airship 19, comprises a plurality of single tube airships 1, joined and connected together in parallel, having cowlings 14, enclosing the fore and aft fuselage sections of the tri-tube airship 19, affixed between the plurality of single tube tubular airships 1. The tri-tube airship 19, thereby providing an airfoil lift from the tri-tube airship 19, fuselage as shown in FIG. 4, in addition to the tubular airships 1, lift characteristics disclosed herein. Referring to FIG. 6, a schematic top & bottom view showing a further understanding of the plurality of single tube airships 1, comprising a tri-tube airship 19, embodiment of the present invention.

Figure 7:
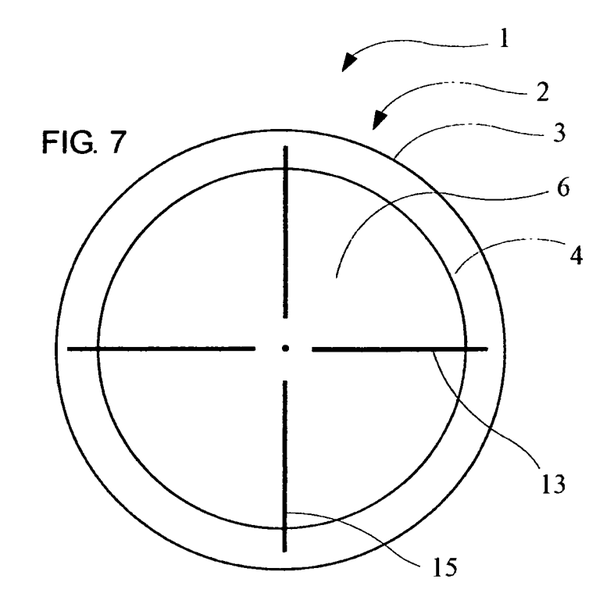
FIG. 7 is a schematic sectional aft view of the present invention.

Referring to FIG. 7, a schematic sectional aft view of the present invention will be seen, showing the tubular airship 1, the fuselage 2, the fuselage tubular hull 3, resilient gas bag 6, fuselage air deflector cone aft 4, bifurcated active & non active horizontal attitudinal control wings aft 13, and bifurcated active & non active vertical attitudinal control wings aft 15.

Figure 8:
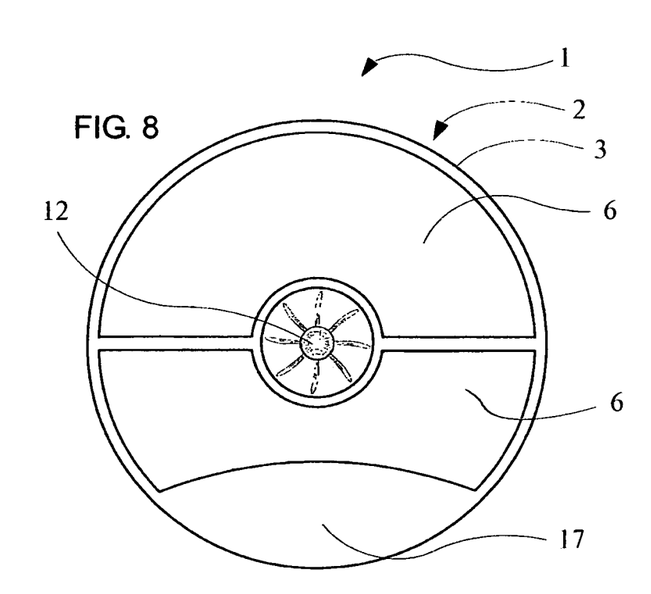
FIG. 8 is a schematic sectional aft view of the present invention.

Referring to FIG. 8, a schematic sectional view of the present invention will be seen showing the airship 1, the fuselage 2, the fuselage tubular hull 3, plurality of resilient gas-bags 6, cargo & operating equipment bay 17, propulsion means 12.

Figure 9:
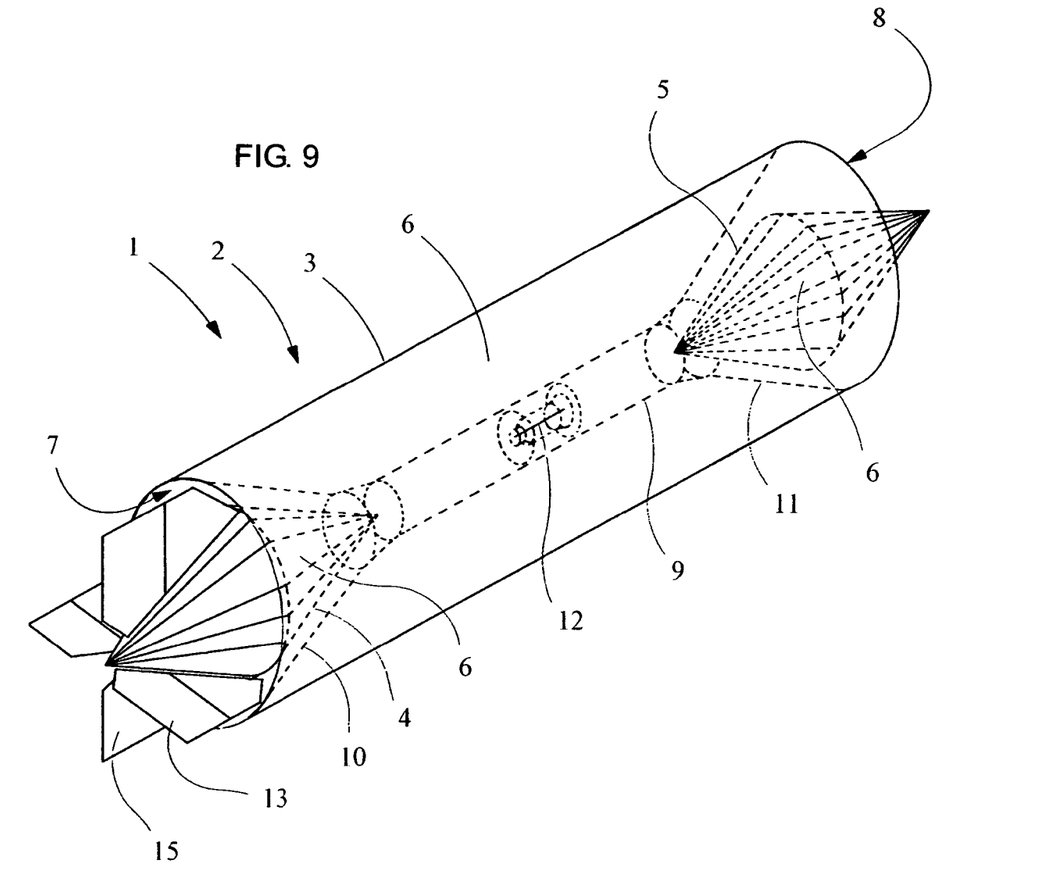
FIG. 9 is a sectional perspective view of the tubular airship showing the aft control surface only embodiment of the present invention.

Referring to FIG. 9, a schematic perspective view will be seen of the tubular airship showing the aft bifurcated active & non active attitudinal control wings only embodiment of the present invention having winged control surfaces in the aft fuselage air outlet 7, only, in the tubular airship 1; the fuselage air deflector cone fore 5, only, positioned in the fuselage air inlet 8, providing reduced weight and air flow restriction into the fuselage inner air passageway inlet funnel 11. The airship 1, shown having a fuselage 2, fuselage tubular hull 3, plurality of resilient gas bags 6, inner air passageway 9, propulsion means 12, fuselage air deflector cone aft 4, fuselage inner air passageway outlet funnel 10, bifurcated active & non active horizontal attitudinal control wings 13, bifurcated active & non active vertical attitudinal control wings 15, and fuselage air outlet 7.

Figure 10:
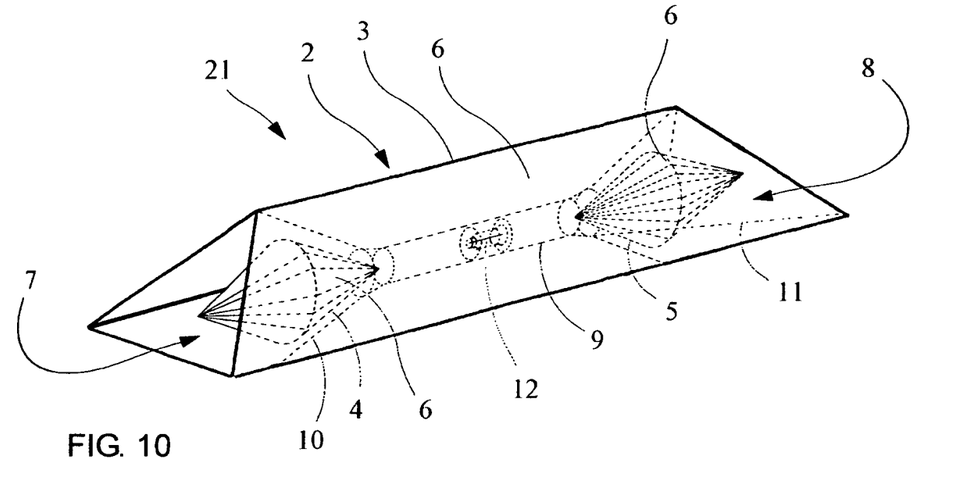
FIG. 10 is a sectional perspective view of the airship showing the tubular airship polygonal radar resistant fuselage embodiment of the present invention.

Referring to FIG. 10, it will be seen a schematic perspective view of said tubular airship 1, showing the tubular airship polygonal fuselage 21, embodiment of the present invention. Wherein it will be seen the fuselage 2, and the tubular hull 3, a plurality of resilient gas bags 6, fuselage air inlet 8, the fuselage inner air passageway inlet funnel 11, the fuselage air deflector cone fore 5, the fuselage inner air passageway 9, the propulsion means 12, the fuselage air deflector cone aft 4, the fuselage inner air passageway outlet funnel 10, the fuselage air outlet 7, providing an understanding of the tubular airship polygonal fuselage embodiment 21, showing the radar wave dissipating angular surfaces of the invention disclosed herein.

Figure 10A:
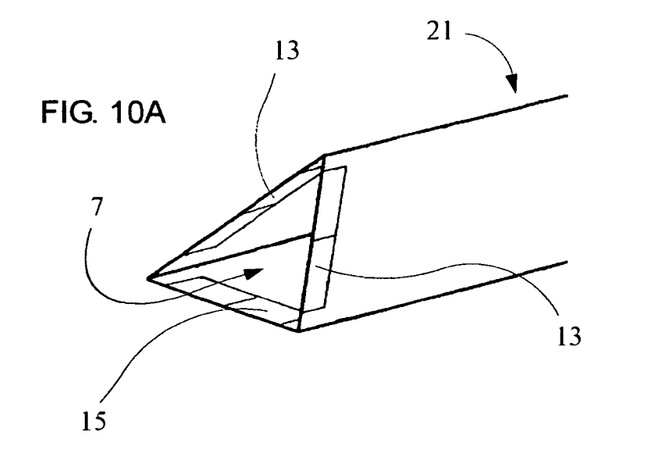
FIG. 10A is a sectional perspective partial view of the airship showing the aerodynamic control surfaces of the radar resistant fuselage embodiment of the present invention.

Referring to FIG. 10A, it will be seen a sectional schematic perspective partial aft view of said tubular airship 1, showing the tubular airship polygonal fuselage 21, embodiments horizontal control wings aft 15, vertical control wings aft 13, and the fuselage air outlet 7; further it will be understood that FIG. 10A, shall additionally represent the tubular airship polygonal fuselage 21, embodiments horizontal control wings fore 14, vertical control wings fore 16, and the fuselage air inlet 8, having an identical structure as the airship aft components.

Figures 11, 11A:
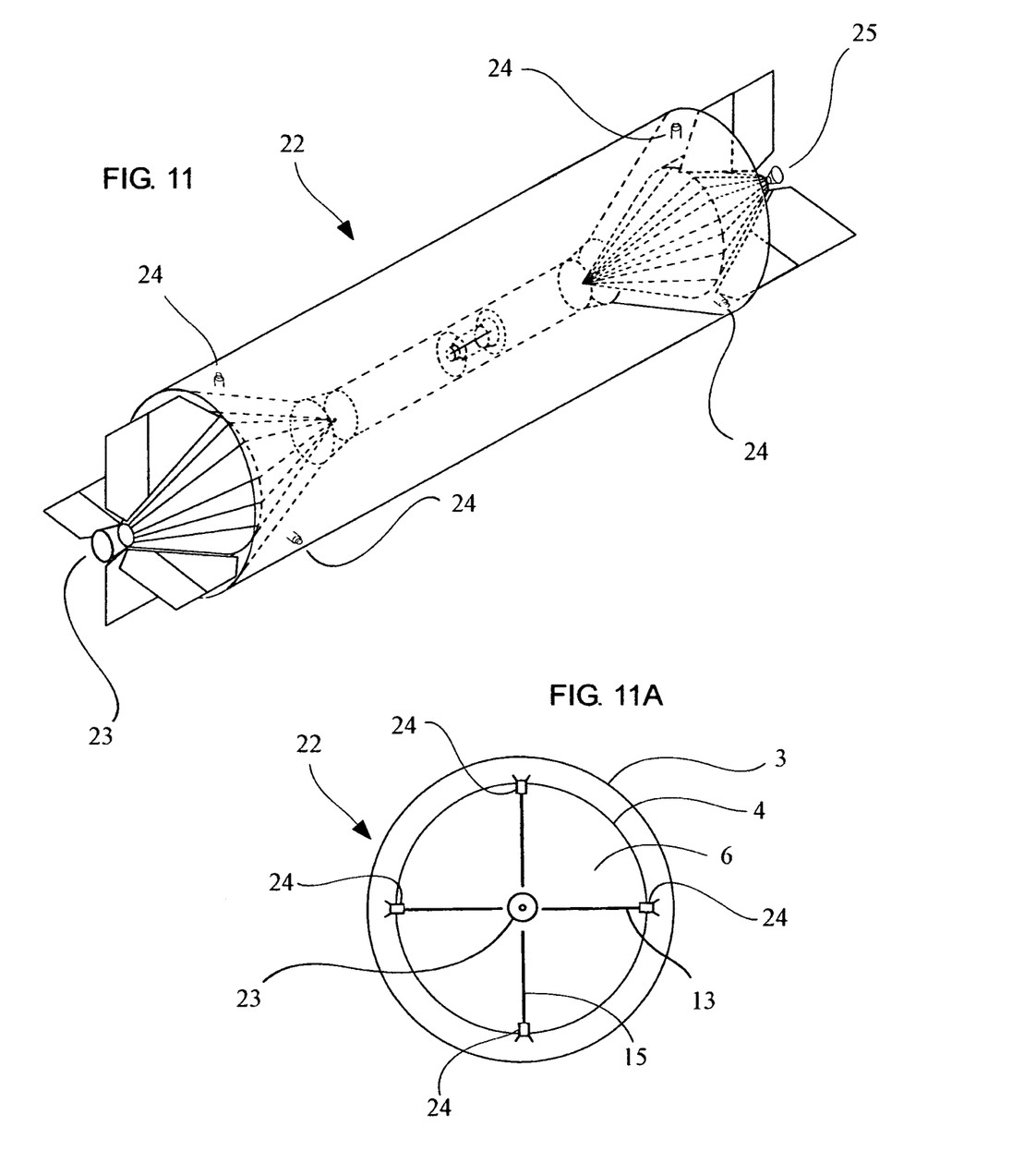
FIG. 11 is a sectional perspective view of the airship showing the propulsion rocket thrust nozzle, directional control rocket thruster nozzles, and reverse rocket thrust nozzle of the airship spaceship embodiment of the present invention.
FIG. 11A is a sectional schematic end view of the airship showing the propulsion rocket engine thrust nozzle, and directional control rocket engine thruster nozzles of the airship spaceship embodiment of the present invention.

Referring to FIG. 11, it will be understood a schematic perspective view of the airship spaceship 22, embodiment of the present invention, additionally to the invention as defined in FIG. 1, further including a propulsion rocket engine thrust nozzle 23, a plurality of directional control rocket engine thrust nozzles 24, and a reverse rocket engine thrust nozzle 25, thereby providing the means of propulsion, directional, and attitudinal control inside and outside the earth's atmosphere, and in transition to and from thereof. This definition is interpreted as if all of the language of FIG. 1, were incorporated.

Referring to FIG. 11A, it will be understood a sectional aft view of the airship spaceship 22, embodiment of the present invention additionally to the invention as defined in FIG. 1, further including the fuselage tubular hull 3, fuselage air deflector cone aft 4, resilient gas bag 6, the bifurcated active & non active horizontal attitudinal control wings 13, bifurcated active & non active vertical attitudinal control wings 15, and further including a propulsion rocket engine thrust nozzle 23, and a plurality of directional control rocket engine thrust nozzles 24; further it will be understood that FIG. 10A, shall additionally represent the tubular airship polygonal fuselage 21, embodiments horizontal control wings fore 14, vertical control wings fore 16, and the fuselage air inlet 8, having an identical structure as the airship aft components. This definition is interpreted as if all of the language of FIG. 1, were incorporated.

Although the best mode contemplated by the inventor of carrying out the present invention is disclosed above, practice of the present invention is not limited thereto. It will be manifest that various additions, modifications and rearrangements of the features of the present invention may be made without deviating from the spirit and scope of the underlying inventive concept. In addition, the individual components need not be fabricated from the disclosed material, but could be fabricated from virtually any suitable material. Moreover, the individual components need not be formed in the disclosed shapes, or assembled in the disclosed configuration, but could be provided in virtually any shape, and assembled in virtually any configuration. Further, although many elements and components are described herein as physically separate modules, it will be manifest that they may be integrated into the apparatus with which it is associated. Furthermore, all the disclosed features of each disclosed embodiment can be combined with, or substituted for, the disclosed features of every other disclosed embodiment except where such features are mutually exclusive.

Operation

The manner of using the improved airship as so far described, it will be apparent that by filling said plurality of resilient gas bags with helium or hydrogen gas, and fueling said plurality of propulsion means fuel tanks, and by initiating the jet engine combustion sequence and thereby the air propulsion, that, air flow will thereby be directed into the airship fore air intake funnel, around the fore air deflector cone & winged air control surfaces into & through the inner air passageway, into & through the engine propulsion means, out through the aft air funnel around the aft air deflector cone & winged air control surfaces so that by variably increasing and decreasing propulsion means rpm thereby air flow, and operate-ably actuating the winged air control surfaces said air ship is operate-ably controllably flown through the air, at improved speed, control, & economy.

It will further be apparent that by flying the airship as previously described, ascending to altitudes near space using dynamic buoyant lift provided by the plurality of resilient gas bags, compressors, tanks, and jet engine propulsion to beyond jet engine oxygen requirements, that by initiating rocket engine propulsion, and attitudinal thrusters, outer atmosphere space directional control is thereby provided.

Further yet that flight of the airship to altitudes below space and into inner atmosphere is provided by using rocket engine thrusters & dynamic buoyant lift provided by the plurality of resilient gas bags, compressors, & tanks, and that upon descent into inner atmosphere space to altitude and oxygen levels sufficient for jet engine ignition, jet engine ignition is initiated thereby providing airship propulsion and attitudinal control for inner atmospheric flight.

It will still further be apparent that by operating the airship as afore described and installing explosives materials in the cargo bay that the means of a buoyant missile is herein provided.

I claim:

1. An airship comprising:
    a linear fuselage containing a first end and a second end, and an interior;
    a funnel-shaped inlet formed at said first end, and containing an inner wall defining a progressively smaller diameter as the inlet extends within said fuselage from said first end to said interior of said fuselage;
    a funnel-shaped outlet formed at said second end, and containing a second inner wall defining a progressively smaller diameter as the outlet extends within said fuselage from said second end to said interior; and
    an inner air passageway contained within said fuselage and connecting said inlet with said outlet, wherein said inner air passageway provides fluid communication between said inlet and said outlet;
    a first conical air deflector fixed within and congruent to said funnel-shaped inlet, thereby providing an annular air passageway between said funnel-shaped inlet and said first conical air deflector;
    a second conical air deflector fixed within said funnel-shaped inlet and having a second widest portion positioned against a corresponding first widest portion of said first conical air deflector.

2. The airship of claim 1 further comprising a propulsion system located in said inner air passageway, wherein said propulsion system draws air into the funnel-shaped inlet and pushes air out of the funnel-shaped outlet.

3. The airship of claim 1 further comprising a first horizontal control wing fixed to said funnel-shaped inlet.

4. The airship of claim 3 further comprising a second horizontal control wing fixed to said funnel-shaped outlet.

5. The airship of claim 1 further comprising a first vertical control wing fixed to said funnel-shaped inlet.

6. The airship of claim 5 further comprising a second vertical control wing fixed to said funnel-shaped outlet.

7. The airship of claim 1 further comprising a third conical air deflector fixed within and congruent to said funnel-shaped outlet, thereby providing a second annular air passageway between said funnel-shaped outlet and said third conical air deflector.

8. The airship of claim 1 further comprising a fourth conical air deflector fixed within said funnel-shaped outlet and having a fourth widest portion positioned against a corresponding third widest portion of said third conical air deflector.

9. An airship comprising:
    a tubular fuselage containing a first end and a second end, and an interior;
    a funnel-shaped inlet formed at said first end, and containing an inner wall defining a progressively smaller diameter as the inlet extends within said fuselage from said first end to said interior;
    a funnel-shaped outlet formed at said second end, and containing a second inner wall defining a progressively smaller diameter as the outlet extends within said fuselage from said second end to said interior;
    an inner air passageway connecting said inlet with said outlet, wherein said inner air passageway provides fluid communication between said inlet and said outlet; and a propulsion system located in said inner air passageway, wherein said propulsion system draws air into the funnel-shaped inlet and pushes air out of the funnel-shaped outlet;

a first conical air deflector fixed within and congruent to said funnel-shaped inlet, thereby providing an annular air passageway between said funnel-shaped inlet and said first conical air deflector;

a second conical air deflector fixed within said funnel-shaped inlet and having a second widest portion positioned against a corresponding first widest portion of said first conical air deflector;

a third conical air deflector fixed within and congruent to said funnel-shaped outlet, thereby providing a second annular air passageway between said funnel-shaped outlet and said third conical air deflector; and a fourth conical air deflector fixed within said funnel-shaped outlet and having a fourth widest portion positioned against a corresponding third widest portion of said third conical air deflector.

10. The airship of claim 9 further comprising:
a first horizontal control wing fixed to said funnel-shaped inlet;
a second horizontal control wing fixed to said funnel-shaped outlet;
a first vertical control wing fixed to said funnel-shaped inlet; and
a second vertical control wing fixed to said funnel-shaped outlet.

11. An airship comprising:
a linear and fuselage containing a first end and a second end, and an interior;
a funnel-shaped inlet formed at said first end, and containing an inner wall defining a progressively smaller diameter as the inlet extends within said fuselage from said first end to said interior of said fuselage;
a funnel-shaped outlet formed at said second end, and containing a second inner wall defining a progressively smaller diameter as the outlet extends within said fuselage from said second end to said interior;
an inner air passageway connecting said inlet with said outlet, wherein said inner air passageway provides fluid communication between said inlet and said outlet;
a propulsion system located in said inner air passageway, wherein said propulsion system draws air into the funnel-shaped inlet and pushes air out of the funnel-shaped outlet;
a first conical air deflector fixed within said funnel-shaped inlet;
a second conical air deflector fixed within said funnel shaped outlet;
a first horizontal control wing fixed to said funnel-shaped inlet;
a second horizontal control wing fixed to said funnel-shaped outlet;
a first vertical control wing fixed to said funnel-shaped inlet;
a second vertical control wing fixed to said funnel-shaped outlet.

* * * * *